United States Patent [19]

Kato et al.

[11] Patent Number: 4,779,958
[45] Date of Patent: Oct. 25, 1988

[54] LIQUID CRYSTAL DEVICE HAVING DIFFERENT NATURAL AND INDUCED TWISTS

[75] Inventors: Yoshinori Kato, Hyogo; Kiyoshi Shohara, Yokohama; Yoshihiro Kinoshita, Yamato; Shoichi Matsumoto, Yokohama, all of Japan

[73] Assignee: Kabushiki Kaisha Toshiba, Japan

[21] Appl. No.: 64,001

[22] Filed: Jun. 19, 1987

[30] Foreign Application Priority Data

Jun. 28, 1986 [JP] Japan ................... 61-152190
Jun. 28, 1986 [JP] Japan ................... 61-152191

[51] Int. Cl.$^4$ ........................................... G02F 1/137
[52] U.S. Cl. ............................. 350/341; 350/346; 350/349
[58] Field of Search .......... 350/346, 341, 350 R, 350/330, 349

[56] References Cited

U.S. PATENT DOCUMENTS

| | | | |
|---|---|---|---|
| 4,447,132 | 5/1984 | Zwart | 350/346 |
| 4,566,758 | 1/1986 | Bos | 350/346 |
| 4,579,425 | 4/1986 | Ishii et al. | 350/346 |
| 4,596,446 | 6/1986 | Waters et al. | 350/346 |
| 4,634,229 | 1/1987 | Amstutz et al. | 350/346 |
| 4,653,865 | 3/1987 | Kando et al. | 350/346 |
| 4,664,483 | 5/1987 | Van Sprang et al. | 350/341 |

FOREIGN PATENT DOCUMENTS

| | | |
|---|---|---|
| 0098070 | 1/1984 | European Pat. Off. |
| 0155033 | 9/1985 | European Pat. Off. |
| 3431871 | 3/1985 | Fed. Rep. of Germany |
| 0070814 | 5/1980 | Japan ................... 350/341 |
| 60-107020 | 6/1985 | Japan |

OTHER PUBLICATIONS

Miyaii et al., "Control and Elimination of Disclinations in Twisted Nematic Liquid Crystal Displays" IEEE Trans. on Elec. Dev., vol. ED-24, No. 7, Jul. 1977.
Scheffer et al., "24×80 Character LC Panel Using the Supertwisted Birefringence Effect," SID International Symposium Digest of Technical Papers, pp. 120-123, May 1985.

*Primary Examiner*—Stanley D. Miller
*Assistant Examiner*—David Lewis
*Attorney, Agent, or Firm*—Finnegan, Henderson, Farabow, Garrett and Dunner

[57] ABSTRACT

In a liquid crystal device, liquid crystal molecules are twisted at a predetermined angle $\theta$ within the range of 180° to 360° between a pair of substrates. Molecular alignment films are formed on the inner surfaces of the pair of substrates such that an angle $\alpha$ between the axes of the adjacent liquid crystal molecules falls within the range of 0° to 40°. A liquid crystal composition having a twist abilities falling within the range of $\theta - (2500/\theta) + \sqrt{\alpha}$ (degrees) to $\theta - (12500/\theta) + \sqrt{\alpha}$ (degrees) is filled between the substrates, thereby eliminating a memory phenomenon and alignment defects such as reverse twisting alignment defects and at the same time improving multiplexing drive characteristics.

8 Claims, 7 Drawing Sheets

LIQUID CRYSTAL DEVICE HAVING DIFFERENT NATURAL AND INDUCED TWISTS

The present application claims priority of Japanese Patent Applications Nos. 61-152190 and 61-152191 filed on June 28, 1986, respectively.

FIELD OF THE INVENTION AND RELATED ART STATEMENT

The present invention relates to a liquid crystal device in which liquid crystal molecules have a twist angle of 180° or more between a pair of electrode substrates and, more particularly, to a liquid crystal device suitable for displaying information with highly multiplexed driving.

In recent years, liquid crystal devices such as SBE (Supertwisted Birefringence Effect) or supertwisted liquid crystal device has been developed in which liquid crystal molecules have a twist angle of 180° or more between a pair of electrode substrates.

In such a liquid crystal device, when a voltage applied across the electrodes is changed, a tilt angle of the liquid crystal molecules filled between the electrodes and therefore a birefringence within the liquid crystal layer are changed. A change in birefringence is utilized by polarizing plates as a change in transmittance or reflectance so as to display information.

A guest-host (G.H) liquid crystal containing a dichroic dye is also available. In a guest-host liquid crystal device, when an orientation angle of the liquid crystal molecules is gradually changed, the orientation angle of the dichroic dye is accordingly changed. In this case, no polarizing plates are used or only one polarizing plate is used. Alternatively, by utilizing the principle of display caused by the change in birefringence and the principle of the G H liquid crystal, two polarizing plates may be used.

Such liquid crystal devices are described in detail in Japanese Unexamined Patent Publication Nos. 60-107020 and 59-28130.

OBJECT AND SUMMARY OF THE INVENTION

In the liquid crystal device in which liquid crystal molecules have a twist angle of 180° or more between the pair of electrode substrates, an alignment defect such as "reverse twisting alignment defect" tends to occur.

Moreover, in the above liquid crystal device, a memory phenomenon occurs due to a bistable characteristic.

In addition to the above problems, multiplexing drive characteristics are degraded, and dot matrix display by highly multiplexed driving cannot be performed.

It is, therefore, an object of the present invention to provide a liquid crystal device free from alignment defects such as reverse twisting alignment defect.

It is another object of the present invention to provide a liquid crystal device free from a memory phenomenon.

It is still another object of the present invention to provide a liquid crystal having good multiplexing drive characteristics.

In order to achieve the above objects of the present invention, there is provided a liquid crystal device comprising a pair of substrates opposite to each other, molecular alignment films respectively formed on inner surfaces of the pair of substrates to twist liquid crystal molecules at a predetermined angle $\theta$ within a range between 180° and 360° between the pair of substrates and to set a pretilt angle $\alpha 0$ formed between adjacent ones of the liquid crystal molecules to be within a range of 0° to 40°, and liquid crystal composition a twist ability of which falls within a range of $\theta - (2500/\theta) + \sqrt{\alpha 0}$ (degrees) to $\theta - (12500/\theta) + \sqrt{\alpha 0}$ (degrees).

The term "twist ability" means a liquid crystal composition capacity for a possible range of twist angles. More specifically, the "twist ability" is defined as the possible range of twist angles of the liquid crystal molecules between a pair of electrode substrates while twisting of a given liquid crystal composition is not limited by alignment films to be formed on the pair of substrates. In other words, the twist ability is given by the following relation:

$(360 \times d/Pn)$ (degrees) where Pn is the natural pitch of the liquid crystal composition and d is the distance between the electrode substrates.

The present inventors derived the following equation in order to evaluate multiplexing drive characteristics.

Figure 12:
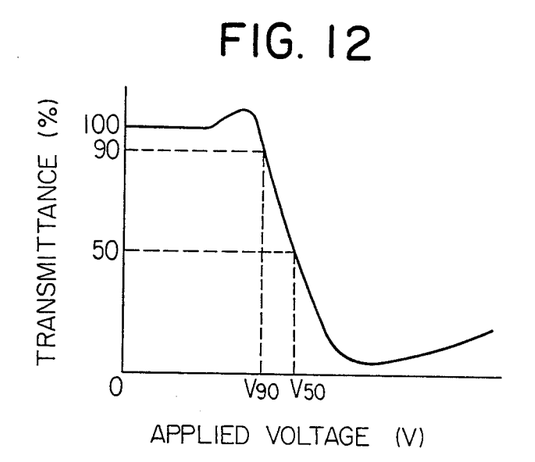
FIG. 12 is a graph showing a voltage vs. transmittance characteristic curve of the liquid crystal device.

As shown in FIG. 12, in the typical voltage vs. transmittance characteristics of the liquid crystal device, a value $\theta$ representing the multiplexing drive characteristics is given by:

$$\gamma = \{(V50 - V90)/V90\} \times 100 \; (\%)$$

where V90 is the voltage corresponding to the transmittance of 90% and V50 is the voltage corresponding to the transmittance of 50%. In this case, the value $\gamma$ indicates the rate of change in the voltage vs. transmittance characteristics. The smaller the value $\gamma$ becomes, the higher multiplexed driving becomes. For example, the value $\gamma$ must be 10.6% or less at a duty ratio of 1/100; the value $\gamma$ must be 7.3% or less at a duty ratio of 1/200; and the value $\gamma$ must be 6.0% or less at a duty ratio of 1/300. The smaller the value $\gamma$ becomes, the higher the contrast becomes.

The present inventors conducted the following experiment and reached a conclusion that a good effect was obtained by the value of the twist ability defined by the above equation.

In the experiment, various types of liquid crystal compositions having different natural pitches Pn were prepared and the relationship between the twist ability and the value $\gamma$ for each composition was measured.

The content of a chiral dopant in the liquid crystal is changed to prepare liquid crystal compositions having different natural pitches Pn. The present inventors added a chiral dopant S-811 available from E. Merck & Co., Inc. to liquid crystal ZLI-2293 available from the same company by changing the contents of the chiral dopant within the range of 0.41 wt % to 0.99 wt %, thereby preparing twenty liquid crystal compositions having natural pitch Pn range of 23 μm to 9 μm. In addition, the combination of the liquid crystal and the chiral dopant was changed to prepare liquid crystal compositions having various natural pitches Pn.

The twist ability can be calculated on the basis of the natural pitch Pn and the distance d between the pair of substrates of the liquid crystal cell.

The value $\gamma$ can be calculated in accordance with the voltage vs. transmittance oharacteristic curve.

The theoretical conclusion derived from the above experiment is that the value of the twist ability must be smaller than the twist angle $\theta$ to eliminate alignment defects such as reverse twisting alignmment defects as well as the memory phenomenon and to obtain a smaller γ value. When the twist angle is increased, an optimal value of the twist ability tends to be slightly shifted in a direction from an angle $\theta-70$ to an angle $\theta$. The range of the twist angle is accordingly narrowed.

When the pretilt angle is increased, an optimal value of the twist ability tends to be slightly shifted in a direction from an angle $\theta-70$ to an angle $\theta$.

For the practical temperature range, the driving temperature of the liquid crystal device is considered, for example, in the range of 0° C. to 50° C., and in larger range of $-20°$ C. to 70° C. When a temperature of liquid crystal device becomes higher than room temperature, the alignment defects such as reverse twisting alignment defects may be easily occurred if the twist ability is smaller. When a temperature of liquid crystal device becomes lower than room temperature, memory phenomenon caused by such as hysterisis phenomenon may be easily occurred if the twist ability is larger. These are causing by the fact of temperature dependency of pretilt angle, natural pitch and elastic coefficient.

The present inventors made extensive studies on the relationship between the twist ability and the value γ on the basis of the above conclusion. The present inventors found that a liquid crystal device having excellent characteristics could be realized if a liquid crystal composition having a twist ability falling within the range of $\theta-(2500/\theta)+\sqrt{\alpha 0}$(degrees) to $\theta-(12500/\theta)+\sqrt{\alpha 0}$ (degrees) was used with a consideration of the practical temperature range.

When the twist ability falls within the above range, alignment defects such as reverse twisting alignment defects and the memory phenomenon can be advantageously prevented throughout a large area within the practical temperature range.

The larger the twist angle becomes, the smaller the value γ becomes. The small γ value is advantageously utilized for high-contrast display. In practice, in order to reduce the alignment defects such as reverse twisting alignment defects and the memory phenomenon, it is effective to increase the pretilt angle upon an increase in twist angle. However, the pretilt angle has an optimal value for minimizing the value γ for a given twist angle, and the pretilt angle connot be freely increased. It is therefore important to prevent alignment defects and suppress the memory phenomenon in consideration of the twist ability of the liquid crystal composition.

According to the experiments of the present inventors, if the twist ability fell outside the above range given by the equation, i.e., if the twist ability was shifted below the angle $\theta-(12500/\theta)+\sqrt{\alpha 0}$ (degrees), alignment defects such as reverse twisting alignment defects tended to occur; and if the twist ability was shifted above the angle $\theta-(2500/\theta)+\sqrt{\alpha 0}$ (degrees), the memory phenomenon tended to occur. This phenomenon typically occurs when the twist angle is large and the pretilt angle is small.

DETAILED DESCRIPTION OF PREFERRED EMBODIMENTS

The present invention will be described in detail by way of its examples with reference to the accompanying drawings.

EXAMPLE 1

Figure 1:
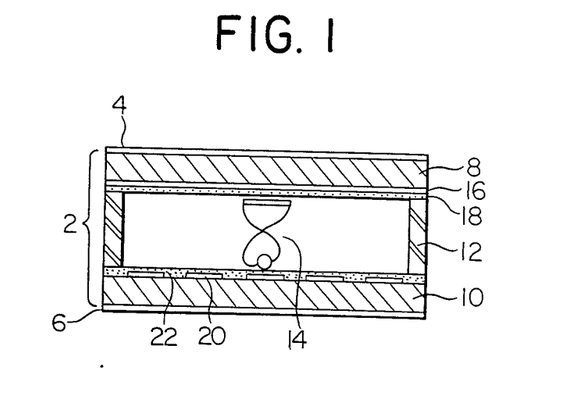
FIG. 1 is a sectional view of a liquid crystal device.

A liquid crystal device in Example 1 has polarizing plates 4 and 6 respectively formed on two major surfaces of a liquid crystal cell 2.

The liquid crystal cell 2 is prepared as follows. Glass substrates 8 and 10 are disposed opposite to each other to have a predetermined gap therebetween. The edges of the glass substrates 8 and 10 are sealed by a sealing agent 12, and a liquid crystal composition 14 is sealed in the internal space.

A plurality of transparent stripe electrodes 16 are formed on the inner surface of the glass substrate 8. A molecular alignment film 18 having a predetermined alignment direction is formed to cover the inner surface of the glass substrate 8 and the transparent electrodes 16.

A plurality of transparent stripe electrodes 20 and a molecular alignment film 22 are formed on the inner surface of the glass substrate 10 of the liquid crystal cell 2 is the same manner as in the glass substrate 8.

The transparent electrodes 16 and 20 are exposed outside the liquid crystal cell 2 (this state is not shown). An external voltage can be selectively applied across the transparent electrodes 16 and 20. The transparent electrodes 16 are perpendicular to the transparent electrodes 20 when viewed from the top. The intersections between the transparent electrodes 16 and 20 define pixels in matrix form.

Alignment treatments of the surfaces of the molecular alignment films 18 and 22 are performed such that the alignment directions differ from each other. The liquid crystal molecules of the liquid crystal composition 14 are twisted by an alignment treatment angle between the glass substrates 8 and 10.

The liquid crystal composition 14 is prepared by adding a chiral dopant to a nematic liquid crystal.

The polarizing plates 4 and 6 are respectively formed on the outer surfaces of the glass substrates 8 and 10 of the liquid crystal cell 2, as shown in FIG. 1.

Figure 2:
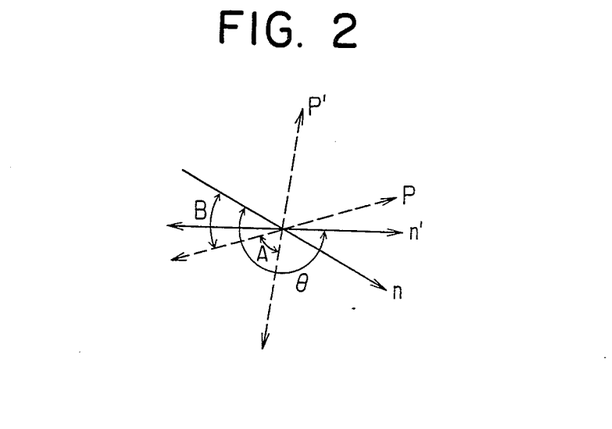
FIG. 2 is a graph showing the relationship between the directions of absorption axes of polarizing plates in the liquid crystal device and the directions of directors of liquid crystal molecules.

As shown in FIG. 2, directions of absorption axes p and p' of the polarizing plates 4 and 6 define predetermined angles together with directions n and n' of liquid crystal molecules, i.e., directors (to be refferred to as directors n and n' hereinafter) contacting the molecular alignment films 18 and 22 of the glass substrates 8 and 10.

In Example 1, the liquid crystal composition 14 was prepared by adding a chiral dopant S-811 available from E. Merck & Co., Inc. to a phenylcyclohexane liquid crystal ZLI-2293 2293 available from the same company. The molecular alignment films 18 and 22 were prepared such that polyimide LX-1400 available from Hitachi Chemical Co., Ltd. was applied to the corresponding glass substrates and the resultant polyimide films were rubbed in one direction. In this case, the pretilt angle of the liquid crystal molecules on the surface of the molecular alignment film, that is, a pretilt angle (to be referred to as a pretilt angle hereinafter) was 2.5.

The glass substrates 8 and 10 were adhered to constitute the liquid crystal cell 2 such that an angle between the rubbing directions of the surfaces of the molecular alignment films 18 and 22 on the glass substrates 8 and 10, respectively, was 180° and that a gap between the glass substrates 8 and 10 was 6.5 μm.

The polarizing plates 4 and 6 were respectively arranged on the glass substrates 8 and 10 of the liquid crystal cell 2 to prepare the liquid crystal device such that an angle between the directions of absorption axes p and p' of the polarizing plates 4 and 6 was 80°, and that an angle B between the director n of the liquid crystal molecules contacting the molecular alignment film 18 of the glass substrate 8 and the absorption axis p of the polarizing plate 4 was 50° (FIG. 2).

Liquid crystal compositions having different pitches Pn obtained by changing the mixing ratio of the chiral dopant to the liquid crystal were respectively filled in liquid crystal devices having the above structure to obtain various samples.

Voltage vs. transmittance characteristic curves of these samples were measured and values γ were calculated. In addition, the twist abilities of the liquid crystal compositions in these liquid crystal devices were calculated in accordance with the natural pitches Pn of the liquid crystal compositions and the distance d between the glass substrates 8 and 10. The relationships between the twist abilities and the values γ are plotted as a curve a in FIG. 3. These relationships are normalized with the angle θ of the alignment treatment direction to obtain a curbe a in FIG. 4.

Figure 3:
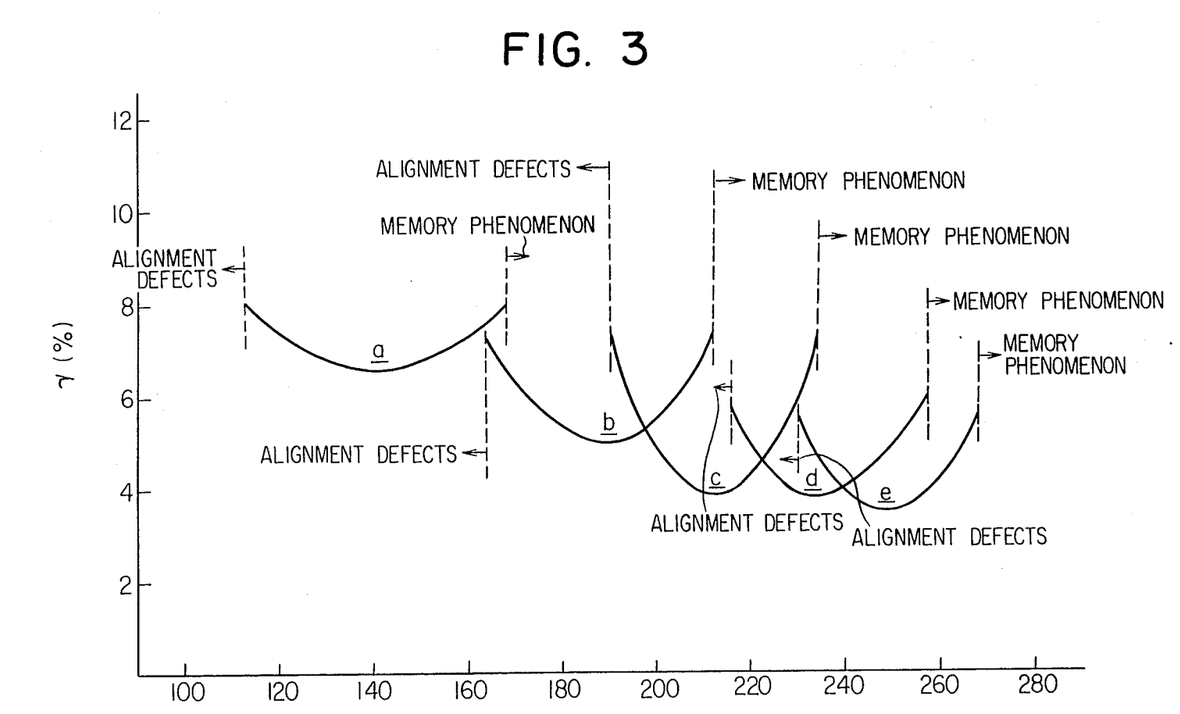
FIGS. 3, 4, 6, 9, and 10 are graphs each showing the relationship between the twist ability and the value γ as the index of highly multiplexed driving.
Figure 4:
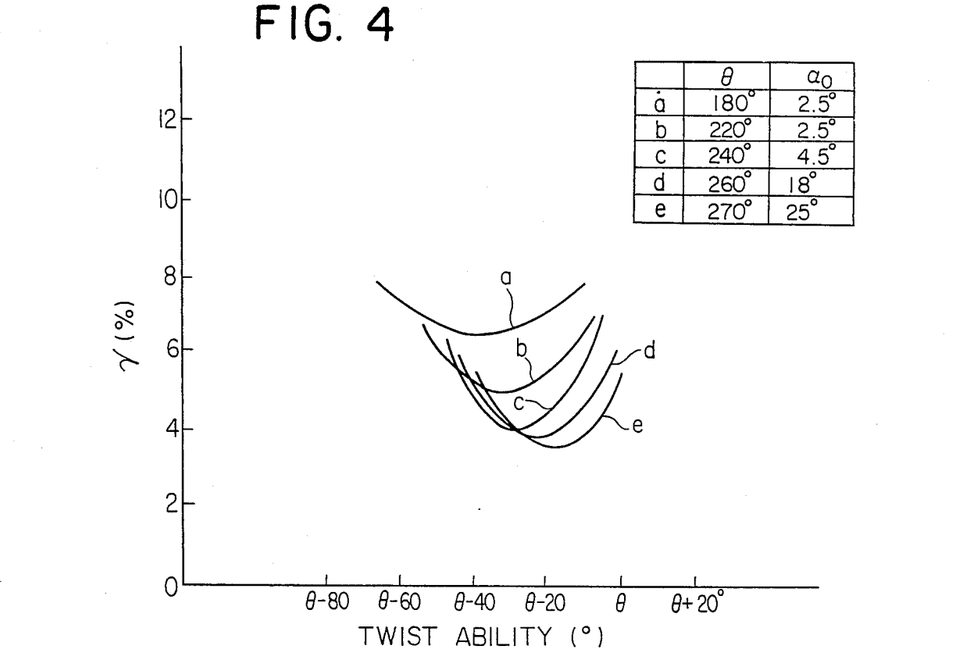

As can be apparent from FIGS. 3 and 4, if the twist ability of the liquid crystal composition falls within the range of 112° to 168°, i.e., in the range of $\theta - (2500/\theta) + \sqrt{a0}$ (degrees) to $\theta - (12500/\theta) + \sqrt{a0}$ (degrees) with respect to the angle θ of the alignment treatment direction, the value can be reduced to allow highly multiplexed driving. The memory phenomenon which is caued by bistable characteristics and the alignment defects such as reverse twisting alignment defects, both of which are eliminated in the practical temperature range. The liquid crystal molecules was uniformly aligned and when the liquid crystal device satisfying the above condition is driven at a duty ratio of 1/100, high-contrast display could be obtained.

Figure 5:
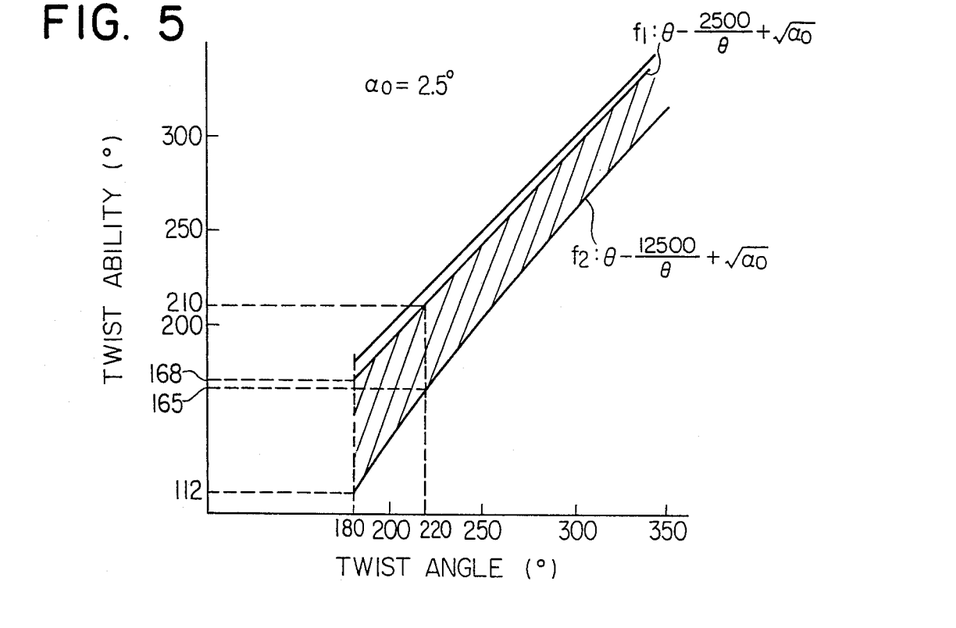
FIGS. 5, 7, 8, and 11 are graphs each showing the relationship between the twist angle and the twist ability.

The range of the twist ability as a function of twist angle is shown in FIG. 5.

EXAMPLE 2

Following the same procedures as in Example 1 except that an angle between the rubbing directions of the surfaces of molecular alignment films 18 and 22 of glass substrates 8 and 10, respectively, was 220°, a liquid crystal cell was prepared. An angle between the directions of the absorption axes p and p' of polarizing plates 4 and 6, respectively, was 70°, and an angle B between the director n of the liquid crystal molecules contacting the molecular alignment film 18 on the glass substrate 8 and the absorption axes p of the polarizing plate 4 was 20°. Following the same procedures as in Example 1, liquid crystal compositions having various natural pitches and prepared by adding the chiral dopant S-811 to the liquid crystal ZLI-2293 were respectively filled in liquid crystal devices each having the above structure. Voltage vs. transmittance characteristic curves of the resultant liquid crystal devices as well as values γ were calculated.

The relationships between the twist abilities and the values γ are plotted as curves b in FIGS. 3 and 4. As a result, the value γ was 7.3% or less at a duty ratio of 1/200 in the twist ability range of $\theta - (2500/\theta) + \sqrt{a0}$ (degrees) to $\theta - (12500/\theta) + \sqrt{a0}$ (degrees). The memory phenomenon which is caused by bistable characteristics and alignment defects such as reverse twisting alignment defects, could be eliminated in the practical temperature range. As a result, the liquid crystal molecules were uniformly aligned, even if the liquid crystal devices belonging to the range were driven at a duty ratio of 1/200, and high-contrast display could be obtained.

The range of the twist ability as a function of twist angle is shown in FIG. 5.

EXAMPLE 3

A liquid crystal cell 2 in Example 3 was prepared following the same procedures as in Example 1 except that polyimide LP2 available from TORAY INDUSTRIES., INC. was used to form molecular alignment films 18 and 22 upon rubbing in one direction. The pretilt agnle of the liquid crystal molecules in the molecular alignment film was 4.5°. An angle between the rubbing directions of the surfaces of the molecular alignment films 18 and 22 of glass substrates 8 and 10, respectively, was 240°, and an angle A between the directions of the absorption axes p and p' of polarizing plates 4 and 6, respectively, was 60°. An angle B between the director n of the liquid crystal molecules contacting the molecular alignment film 18 of the glass substrate 8 and the absorption axis p of the polarizing plate 4 was 50°. Following the same procedures as in Example 1, liquid crystal compositions having various natural pitches and prepared by adding the chiral dopant S-811 to the liquid crystal ZLI-2293 were respectively filled in liquid crystal devices each having the above structure. Voltage vs. transmittance characteristic curves of the resultant liquid crystal devices as well as values γ were calculated.

Figure 6:
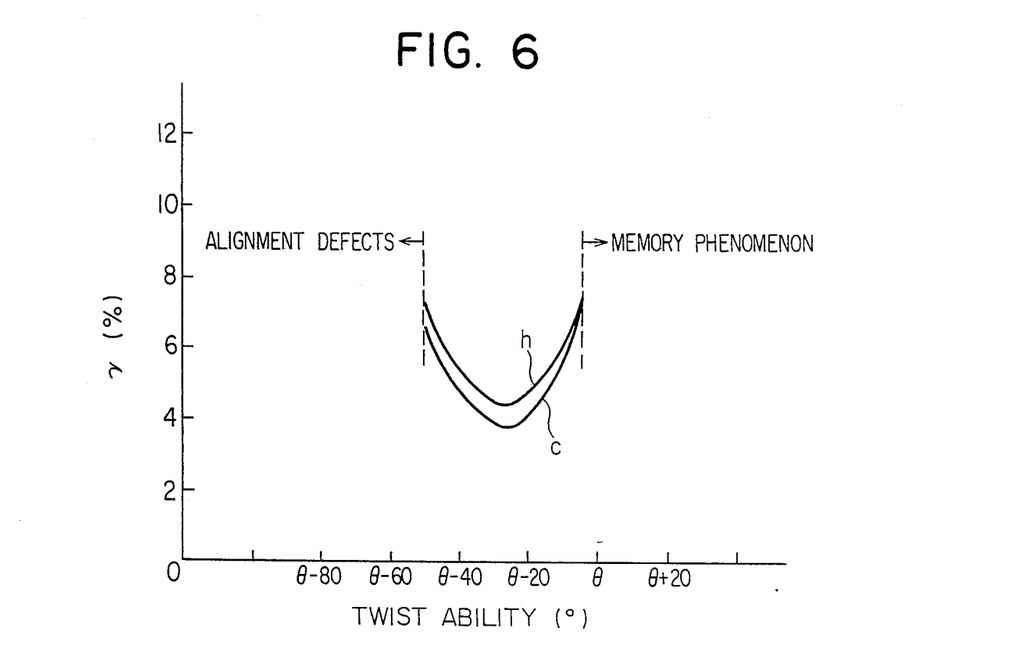

The relationships between the twist abilities and the values γ are plotted as curves c in FIGS. 3, 4, and 6.

As a result, the value γ was 7.3% or less at a duty ratio of 1/200 in the twist ability range of $\theta - (2500/\theta) + \sqrt{a0}$ (degrees) to $\theta - (12500/\theta) + \sqrt{a0}$ (degrees). The memory phenomenon which is caused by bistable characteristics and alignment defects such as reverse twisting alignment defects could be eliminated in the practical temperature range. As a result, the liquid crystal molecules were uniformly aligned, even if the liquid crystal devices belonging to the above range were driven at a duty ratio of 1/200 and high-contrast display could be obtained.

Figure 7:
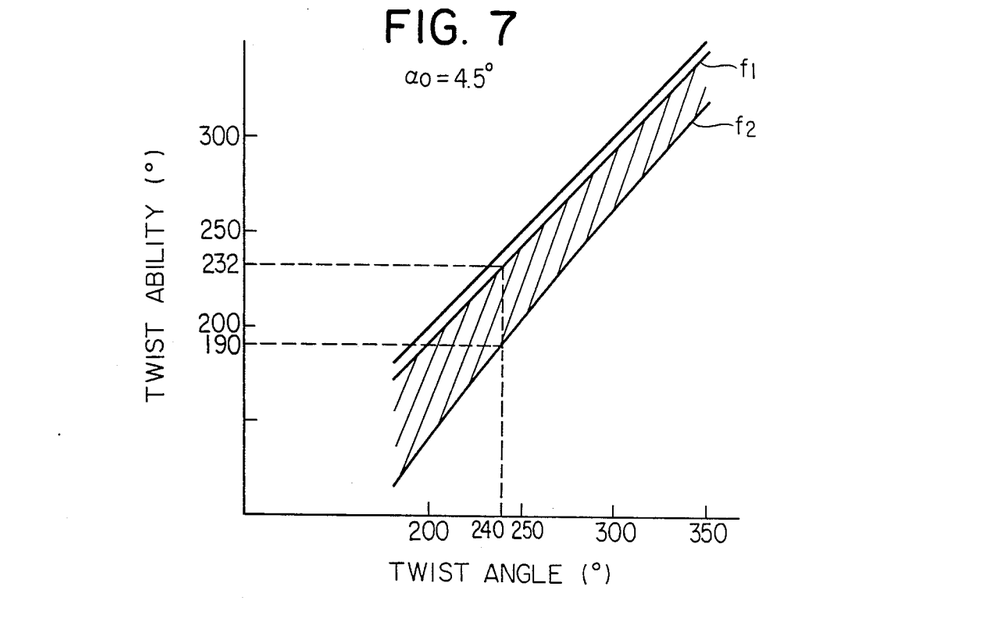

The range of the twist ability as a function of twist angle is shown in FIG. 7.

EXAMPLE 4

A liquid crystal cell 2 in Example 4 was prepared following the same procedures as in Example 1 except that SiO was obliquely deposited at an angle of 85° to form 50-Å thick molecular alignment films 18 and 22. The pretilt angle of the liquid crystal molecules of the molecular alignment film was 18°. An angle between the depositing directions of the molecular alignment films 18 and 22 obliquely deposited on the surfaces of glass substrates 8 and 10, respectively, was 60°, and an angle A between the directions of the absorption axes p and p' of polarizing plates 4 and 6, respectively, was 70°. An angle B between the director n of the liquid crystal molecules contacting the molecular alignment film 18 of the glass substrate 8 and the absorption axis p of the polarizing plate 4 was 50°.

The relationships between the twist abilities and the values γ are plotted as curves d in FIGS. 3 and 4.

As a result, the value γ was 6.0% or less at a duty ratio of 1/300 in the twist ability range of $\theta-(2500/\theta)+\sqrt{\alpha 0}$ (degrees) to $\theta-(12500/\theta)+\sqrt{\alpha}$ (degrees). The memory phenomenon which is caused by bistable characteristics and alignment defects such as reverse twisting alignment defects could be eliminated in the practical temperature range. As a result, the liquid crystal molecules were uniformly aligned, even if the liquid crystal devices belonging to the above range were driven at a duty ratio of 1/300 and high-contrast display could be obtained.

Figure 8:
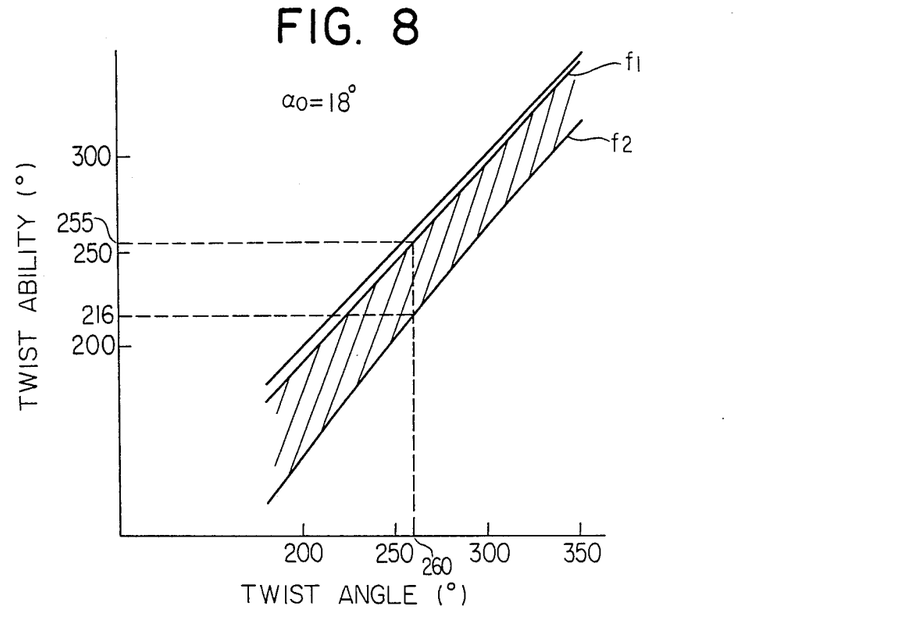

The range of the twist ability as a function of twist angle is shown in FIG. 8.

EXAMPLE 5

A liquid crystal cell 2 in Example 5 was prepared following the same procedures as in Example 1 except that SiO was obliquely deposited at an angle of 85° to form 50-Å thick molecular alignment films 18 and 22. The pretilt angle of the liquid crystal molecules of the molecular alignment film was 25°. An angle between the depositing directions of the molecular alignment films 18 and 22 obliquely deposited on glass substrates 8 and 10, respectively, was 270°. A distance d between the substrate was 7.3 μm. An angle A between the directions of the absorption axes p and p' of polarizing plates 4 and 6, respectively, was 70°. An angle B between the director n of the liquid crystal molecules contacting the molecular alignment film 18 of the glass substrate 8 and the absorption axis p of the polarizing plate 4 was 50°.

The relationships between the twist abilities and the values γ are plotted as curves e in FIGS. 3, 4, 9, and 10.

As a result, the value γ was 6.0% or less at a duty ratio of 1/300 in twist ability range of $\theta-(2500/\theta)+\sqrt{\alpha 0}$ (degrees) to $\theta-(12500/\theta)+\sqrt{\alpha 0}$ (degrees). The memory phenomenon which is caused by bistable characteristics and alignment defects such as reverse twisting alignment defects could be eliminated in the practical temperature range. As a result, the liquid crystal molecules were uniformly aligned, even if the liquid crystal devices belonging to the above range were driven at a duty ratio of 1/300 and high-contrast display could be obtained.

Figure 11:
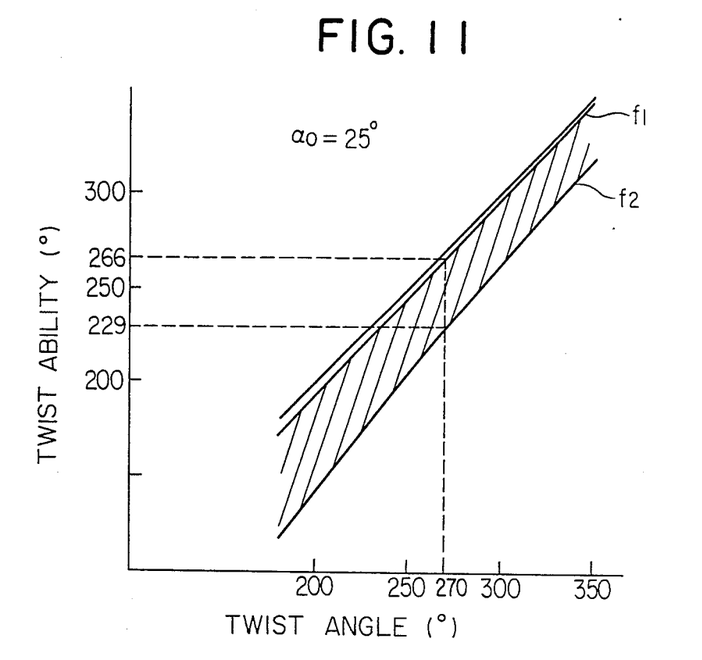

The range of the twist ability as a function of twist angle is shown in FIG. 11.

EXAMPLE 6

A liquid crystal cell 2 in Example 6 was prepared following the same procedures as in Example 1 except that polyimide LP2 was used to form molecular alignment films 18 and 22 upon depositing in one direction. The pretilt angle of the liquid crystal molecules in the molecular alignment film was 4.5°. An angle between the depositing directions of the surfaces of the molecular alignment films 18 and 22 of glass substrates 8 and 10, respectively, was 240°. Only one polarizing plate 4 was used. An angle B between the director n of the liquid crystal molecules contacting the molecular alignment film 18 of the glass substrate 8 and the absorption axis p of the polarizing plate 4 was 90°. Following the same procedures as in Example 1, liquid crystal compositions having various natural pitches and prepared by adding 1 wt % of a blue dichroic dye D82 available from B. D. H. Inc. to the liquid crystal ZLI-2293 were respectively filled in liquid crystal devices each having the above structure. Voltage vs. transmittance characteristic curves of the resultant liquid crystal devices as well as values γ were calculated.

The relationships between the twist abilities and the values are plotted as curves h in FIG. 6.

As a result, the value γ was 7.3% or less at a duty ratio of 1/200 in the twist ability range of $\theta-(2500/\theta)+\sqrt{\alpha 0}$ (degrees) to $\theta-(12500/\theta)+\sqrt{\alpha 0}$ . The memory phenomenon which is caused by bistable characteristics and alignment defects such as reverse twisting alignment defects could be eliminated in the practical temperature range. As a result, the liquid crystal molecules were uniformly aligned, even if the liquid crystal devices belonging to the above range were driven at a duty ratio of 1/200 and high-contrast display could be obtained.

EXAMPLES 7 and 8

A liquid crystal cell 2 in Example 7 was prepared following the procedures as in Example 5 except that a distance d between the substrates was 7.3 μm. A liquid crystal composition was prepared by adding the chiral dopant S-811 to a pyrimidine Nr3022 available from Rosche Corp.

Figure 9:
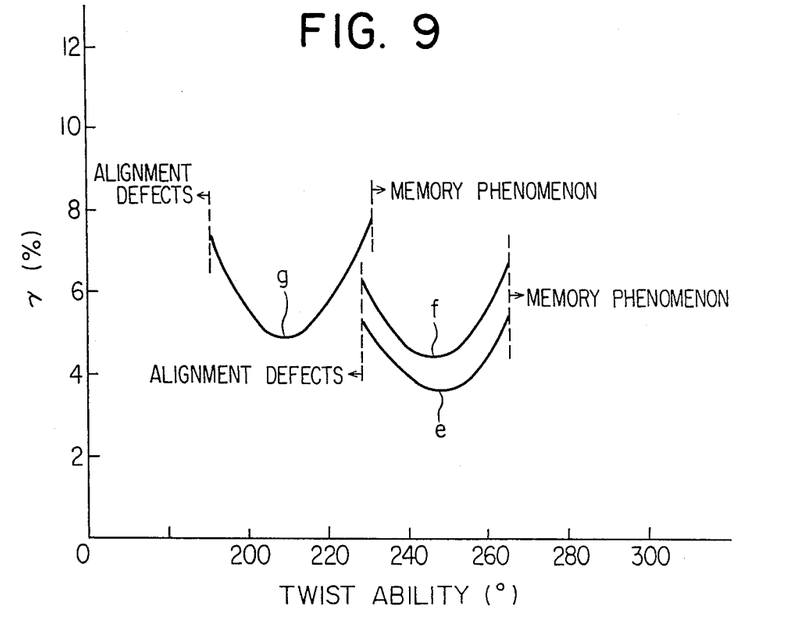
Figure 10:
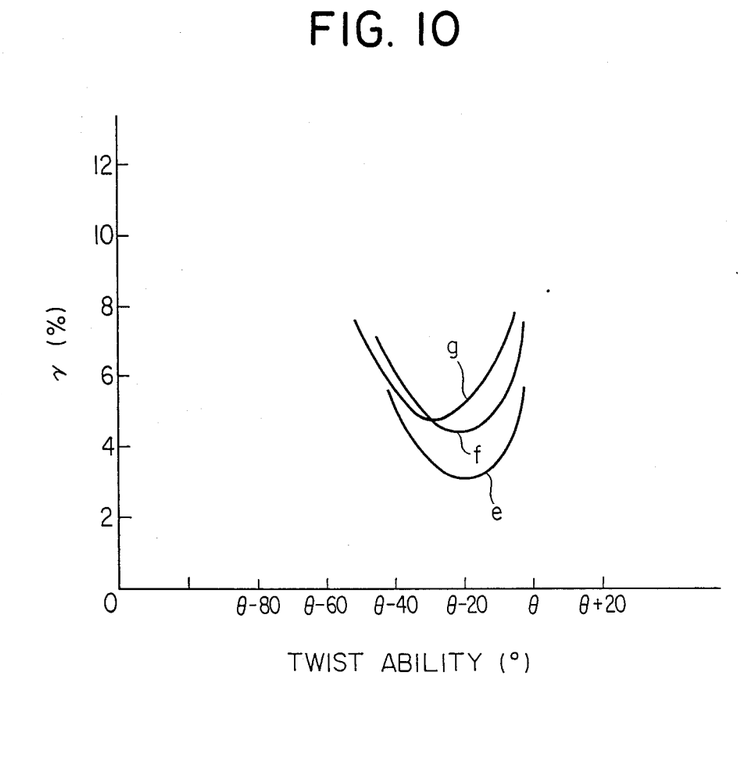

The resultant characteristics are plotted as curves f in FIGS. 9 and 10.

A liquid crystal cell 2 in Example 8 was prepared following the procedures as in Example 3 except that a distance d between the substrates was 5.5 μm. A liquid crystal composition was prepared by adding the chiral dopant S-811 to the pyrimidine Nr3022 available from Rosche Corp.

The resultant characteristics are plotted as curves g in FIGS. 9 and 10.

In the examples described above, phenylcyclohexane and pyrimidine liquid crystal materials are used. However, the present invention is not limited to these liquid crystal materials. For example, Biphenyl bicyclohexane and ester liquid crystal materials may be used to obtain the same effect as described above. The chiral dopant is exemplified by S-811 but is not limited thereto. Other chiral dopants such as chlorestrylnonanoate may be used.

What is claimed is:
1. A liquid crystal device comprising:
a pair of substrates opposite to each other,
a liquid crystal composition, having liquid crystal molecules, positioned between said substrates,
molecular alignment films respectively formed on inner surfaces of the pair of substrates to twist said liquid crystal molecules at a predetermined angle θ within a range between 180° and 360° between the pair of substrates and to set a pretilt angle α0 formed between adjacent ones of the liquid crystal molecules to be within a range of 0° to 40°, and
said liquid crystal composition having a twist ability which falls within a range of $\theta-(2500/\theta)+\sqrt{\alpha 0}$ (degrees) to $\theta-(12500/\theta)+\sqrt{\alpha 0}$ (degrees).
2. The device according to claim 1, wherein the substrates respectively have transparent electrodes on inner surfaces thereof.

3. The device according to claim 2, wherein the transparent electrodes comprise stripe electrodes, respectively.

4. The device according to claim 1, wherein the substrates respectively have polarizing plates on outer surfaces thereof.

5. The device according to claim 1, wherein the molecular alignment films are formed by depositing.

6. The device according to claim 1, wherein the molecular alignment films are formed by oblique deposition.

7. The device according to claim 1, wherein the liquid crystal composition is prepared by adding a chiral dopant to the liquid cystal.

8. The device according to claim 1, wherein the liquid crystal composition ia prepared by adding a chiral dopant and a dichroic dye to a liquid crystal.

* * * * *